Patented Aug. 2, 1932

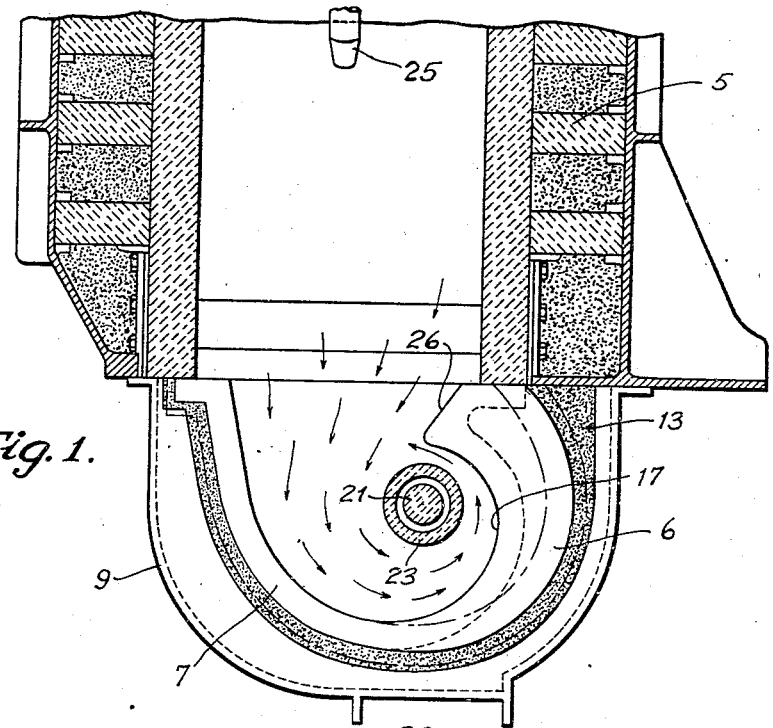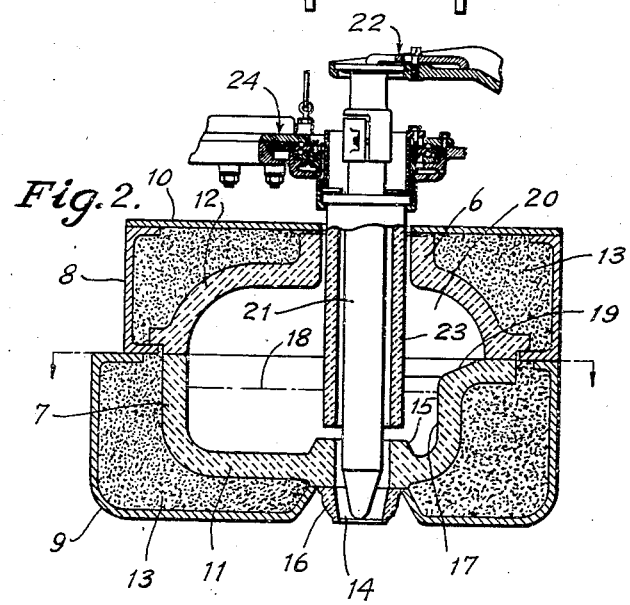

1,870,210

UNITED STATES PATENT OFFICE

LEONARD D. SOUBIER, OF ALTON, ILLINOIS, ASSIGNOR TO OWENS-ILLINOIS GLASS COMPANY, A CORPORATION OF OHIO

APPARATUS FOR FEEDING MOLTEN GLASS

Application filed April 23, 1931. Serial No. 532,190.

This invention relates to the feeding of molten glass and forming it into mold charges suitable for the molds of a forming machine. More particularly it relates to glass feeding apparatus of the type in which the glass passes from a melting furnace through an extension or forehearth and into a feeder bowl or container, and is discharged through a bottom outlet in the floor of the container, the flow being controlled by any suitable means, as for example, an implement operating in the glass above the outlet.

The invention still more particularly relates to a novel means and method for directing a flow of the molten glass to the outlet.

This application is a continuation in part of my prior application, Serial No. 399,461, filed October 14, 1929, and discloses a forehearth and feeder bowl structure broadly similar to that shown in my prior application.

I particularly show and describe my invention as applied to the structure of the well-known Hartford-Empire Company's single feeder shown and described in British Patent No. 227,078 to that company. It is obviously readily adapted to any other feeder providing for a downward discharge of glass from a container.

An object of the present invention is the provision of a forehearth or feeder bowl of novel contour and arrangement, peculiarly adapted to insure a uniform temperature and viscosity of the glass immediately adjacent the discharge outlet, whereby charges properly adapted to the production of high quality glassware may be formed from discharging glass.

A further object of my invention is the provision of a feeder forehearth having a bowl provided with a downwardly opening discharge outlet displaced from the longitudinal median line of the forehearth and bowl, the glass containing portion of the bowl being formed in horizontal section approximately in the shape of an involute curve struck about the axis of the discharge opening.

A further object of my invention is the provision, in a forehearth having the above-mentioned characteristics, of an enlarged firing space above the glass containing portion of the bowl to assure an adequate application of temperature controlling media to all portions of the bowl.

A further object of the invention is to provide, in combination with a forehearth and feeder bowl of the above-mentioned characteristics, a rotating member in substantial axial alignment with the discharge outlet and adapted to aid in the circulation and homogenizing of the glass passing through the forehearth and bowl to the discharge outlet.

A further object of the invention is the provision of a forehearth and feeder bowl of the general characteristics above referred to and provided with temperature controlling means peculiarly adapted to maintain the glass constantly approaching the feeder bowl at uniform and proper temperature.

A further object of my invention is to provide a novel method for controlling the flow of molten glass toward and through a discharge outlet, whereby the glass issuing therefrom is of substantially uniform or at least symmetrical temperature and viscosity, and which is adapted to enter a forming mold in a manner peculiarly adapted to assist in the subsequent formation of articles having walls of uniform and controlled thickness.

Other objects will appear from the following specification and claims.

Heretofore in the practice of feeding mold charges which are severed in suspension from a feeder from which the glass issues downwardly, it has been customary to provide a forehearth or extension terminating in a feeder bowl, the forward end of which is symmetrical and rounded at its forward end, and which contains a discharge outlet arranged substantially on the longitudinal median line of the forehearth structure. The glass flows from the furnace into this forehearth and to the feeder outlet from which it issues, usually under the control of a reciprocating implement or plunger which controls the formation of suspended masses of glass beneath the outlet. Shears separate individual mold charges from these masses. The forehearths are arranged with suitable firing means, and sometimes with cooling means, to suitably control the temperature of the glass. Frequently, as in the British patent above referred to, the implement or plunger is surrounded by a sleeve or tube by means of which a regulation of the weight of the charges is controlled. In spite of the care which is taken to obtain charges of uniform, or at least symmetrical, viscosity and temperature issuing from the discharge outlet, it has often proved difficult, if not impossible, to accomplish this with the prior art devices. It has been proposed to improve this condition by the use of a feeder bowl which is rotated about the axis of the discharge outlet, but such a proposal requires expensive provisions and complicated mechanisms. It has also been proposed to rotate either the reciprocating plunger or the tube, or both, to aid mixing of the glass to assure uniformity of viscosity and temperature.

While such provisions show improved results, they have not entirely solved the problem of assuring uniform temperature and homogeneity of the glass going to form the charges. Much of the non-uniformity, which has been experienced in the past, has resulted from the fact that the glass in such structures as that illustrated in the British patent approaches the outlet from all sides and some of this glass has been in greater contact with the cooler walls of the structure than other portions thereof. This is particularly true of those portions which pass beyond the outlet toward the forward end of the forehearth and are then directed back toward the outlet.

The provision of a rotating member associated with these prior art forehearths, while tending to aid in the homogenizing and equalization of temperatures in the glass because of their rotary or mixing action, also tend positively to upset the desired condition by setting up an unsymmetrical condition as the rotation of the member in a given direction assists the approach of glass to the outlet in one half of the bowl and opposes this approach of the glass to the outlet in the other half of the bowl. This condition is also present to a degree when a rotary bowl is used.

My present invention is, therefore, directed particularly to the means for and method of controlling the flow of the glass from the forehearth proper into and through the bowl and to the feeder outlet in a generally uniform manner. This I accomplish by directing the glass in a spiral or snail-shaped path to the outlet located at the vortex of the spiral about which the rotating member rotates, and thus substantially all of the glass follows approximately the same path and enters the outlet with approximately the same heat treating and with a wrapping or spiral motion. This motion in itself tends also to improve the condition of the glass entering into the charges.

In the accompanying drawing, I have illustrated an embodiment of the mechanical features of my invention which is adapted to perform my novel method, and in which, Figure 1 is a horizontal section of a portion of a forehearth and feeder bowl taken on the lines 1—1 of Fig. 2; and Fig. 2 is a transverse vertical section of a feeder bowl embodying my invention.

Referring now to the drawing, 5 represents a forehearth substantially similar to that illustrated in the afore-mentioned British patent providing a suitable channel through which the glass is brought under proper heat control from a melting furnace (not shown) to a feeder bowl 6 mounted on the forward end of the forehearth 5. The bowl comprises a suitable glass containing basin 7 and a covering portion 8, which portions consist of suitable metallic baskets or containers 9, 10, inner portions 11, 12 of high quality glass resisting refractory material, and between these portions suitable insulating material 13. In the bottom of the basin 7 is a discharge outlet 14 which may be provided with a curb 15 and suitable orifice ring 16, the outlet being located, as shown, to one side of the longitudinal median line of the forehearth 5 and substantially at the vortex of a substantially spiral flow channel defined by the inner wall 17. As shown, this wall is in the form of an incomplete involute curve struck about the axis of the outlet 14.

As illustrated in Fig. 2, the wall of the basin above the glass level 18 slopes outwardly, as indicated at 19, to permit an enlargement of the firing space 20.

A reciprocating implement or plunger 21 is arranged to reciprocate axially of the feeder outlet to control the issuance of the glass therethrough. The mechanism for supporting and reciprocating the plunger is illustrated generally at 22, and may be of any desired type, as for example, that shown in the aforementioned British patent. A sleeve or tube 23 surrounding but spaced from the plunger 21 is mounted so as to cooperate with the curb 15 to form a regulated flow passage for the glass to the outlet 14. The tube is preferably mounted for adjustment vertically and for rotation about the axis of the opening 14, the rotating and positioning mechanism being of any desired character and generally illustrated at 24. This mechanism and mounting may be of the type shown in U. S. Patent No. 1,735,837, to Karl E. Peiler, or of any other desired form to provide a uni-directional rotation of the tube. If desired, the tube may be omitted and the plunger rotated, as well as reciprocated, by any desired mechanism, such for example as that shown in my U. S. Patent No. 1,574,709.

I have diagrammatically illustrated a firing means by the burner 25, which means may be of any desired type, preferably of that shown and described in the aforementioned British patent to Hartford-Empire Company, and which will project flame over the surface of the glass forwardly into the feeder bowl to controllably maintain the temperature of the glass.

The peculiar shape of the bowl illustrated and described lends itself peculiarly to the flow of combustion gases from a burner such as that illustrated in 25, the flame impinging upon the glass and moving forwardly thereof and about the involute curve around the plunger and tube and back to a suitable stack (not shown) rearwardly of the forehearth.

In the operation of the embodiment shown and described, glass flows constantly under gravity head into the rearward end of the forehearth 5, as for example, under a suitable skimmer and sealing block, such as is illustrated in the aforementioned British patent, and flows in a substantially rectilinear path toward the feeder bowl. Preferably, the heating, insulation and controls of the forehearth should be such as to provide a suitable conditioning of the glass as it passes through the forehearth to bring it to substantially the condition desired for the charges. The glass enters the bowl and is directed by the walls 17 and 26 into the snail-like or spiral path as indicated by the arrows in Fig. 1. The flow of the glass in this spiral path is aided by the rotation of the tube in the direction indicated by the arrow.

As the glass passes beneath the tube and into the outlet, it tends to wrap itself around the issuing column. The mass which issues from the orifice is of substantially uniform and certainly symmetrical viscosity and condition. The issue of the glass is controlled by the reciprocations of the plunger 21 in the well-known manner to impart the desired shape to the suspended masses. The position of the tube is regulated to assure proper weight of the charges.

Shears, not shown, but which may be such as those illustrated in the aforementioned British patent, are operated in synchronism with the reciprocations of the plunger, and sever mold charges from the masses which have been formed in suspension below the outlet 14. These charges drop directly into molds or may be conveyed thereto by any suitable and well-known means.

It is obvious that various modifications of the apparatus and variations of the method herein shown and described may be made within the spirit of my invention, as set forth in the appended claims.

Having fully described my invention, I claim:

1. Glass feeding apparatus comprising a forehearth for molten glass, a feeding bowl attached thereto, said bowl having a bottom outlet opening arranged at one side of the longitudinal median line of the forehearth, and a channel shaped to direct the glass in a spiral path to the outlet.

2. Glass feeding apparatus comprising a forehearth for molten glass, a feeding bowl attached thereto, said bowl being provided with a bottom outlet opening arranged at one side of the longitudinal median line of the forehearth, and with a channel shaped to direct the glass in a spiral path to the outlet, and a rotating member immersed in the glass in the bowl to aid in the movement of the glass.

3. Glass feeding apparatus comprising in combination a forehearth adapted to receive glass from a furnace and direct its movement in a substantially rectilinear path to a feeding bowl, a bowl provided with a bottom outlet at one side of the longitudinal median line of the forehearth, an implement projecting into the glass above the outlet, means to rotate the implement, and a channel for directing the glass in a spiral path to the outlet.

4. Glass feeding apparatus comprising a container for molten glass provided with a bottom outlet offset from the median line of said container, said container being shaped to provide a channel comprising a straight line portion extending toward the outlet and an annular portion surrounding the outlet, a reciprocable implement projecting into the glass above the outlet and adapted by its reciprocation to control the issuance of glass to the outlet, and a revolving member immersed in the glass adjacent the outlet.

Signed at Alton, Illinois, this 20th day of April, 1931.

LEONARD D. SOUBIER.